(12) United States Patent
Suzuki et al.

(10) Patent No.: US 10,989,120 B2
(45) Date of Patent: Apr. 27, 2021

(54) VEHICLE-MOUNTED CONTROL DEVICE

(71) Applicant: Hitachi Automotive Systems, Ltd., Hitachinaka (JP)

(72) Inventors: Kohei Suzuki, Ibaraki (JP); Toshio Hori, Ibaraki (JP); Yoshiaki Nagasawa, Ibaraki (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 141 days.

(21) Appl. No.: 15/573,909

(22) PCT Filed: Jun. 3, 2016

(86) PCT No.: PCT/JP2016/066529
§ 371 (c)(1),
(2) Date: Nov. 14, 2017

(87) PCT Pub. No.: WO2016/208360
PCT Pub. Date: Dec. 29, 2016

(65) Prior Publication Data
US 2018/0355806 A1 Dec. 13, 2018

(30) Foreign Application Priority Data
Jun. 25, 2015 (JP) .............................. JP2015-127204

(51) Int. Cl.
*F02D 11/10* (2006.01)
*F02D 41/06* (2006.01)
(Continued)

(52) U.S. Cl.
CPC ............ *F02D 17/04* (2013.01); *F02D 11/105* (2013.01); *F02D 29/02* (2013.01);
(Continued)

(58) Field of Classification Search
CPC .... F02D 41/0002; F02D 17/04; F02D 11/105; F02D 11/0844; F02D 29/02;
(Continued)

(56) References Cited

U.S. PATENT DOCUMENTS

2002/0019691 A1   2/2002  Matsubara et al.
2002/0070555 A1*  6/2002  Osada ................. F02N 11/0866
                                                        290/31
(Continued)

FOREIGN PATENT DOCUMENTS

CN  1912377 A  2/2007
CN  1965158 A  5/2007
(Continued)

OTHER PUBLICATIONS

International Search Report (PCT/ISA/210) issued in PCT Application No. PCT/JP2016/066529 dated Sep. 13, 2016 with English-language translation (Four (4) pages).
(Continued)

*Primary Examiner* — Phutthiwat Wongwian
*Assistant Examiner* — Arnold Castro
(74) *Attorney, Agent, or Firm* — Crowell & Moring LLP

(57) ABSTRACT

There is provided a vehicle-mounted control device that, when a restart request is generated during a time interval between the fulfillment of an engine automatic stop condition and complete stop, decreases a charging efficiency of an engine by means of at least one of a throttle valve and an intake valve to prevent an increase in the reverse rotational frequency of the engine, thereby ensuring the durability of the starting device of the engine, and preventing an accelerator response from deteriorating when a restart request based on the accelerator operation is generated. In the vehicle-mounted control device that controls a charging efficiency of the engine on the basis of the requested engine
(Continued)

output amount, the engine is automatically stopped when a predetermined automatic stop condition is fulfilled, and a charging efficiency at the time when a restart condition of the engine has been fulfilled on the basis of an engine output request generated during a time interval between the fulfillment of the automatic stop condition and complete stop of the engine is made lower than a charging efficiency for the requested engine output amount.

6 Claims, 12 Drawing Sheets

(51) Int. Cl.
    *F02D 41/00*     (2006.01)
    *F02D 11/08*     (2006.01)
    *F02D 17/04*     (2006.01)
    *F02D 29/02*     (2006.01)
    *F02N 19/00*     (2010.01)
    *F02N 11/08*     (2006.01)

(52) U.S. Cl.
    CPC ....... *F02D 41/0002* (2013.01); *F02D 41/065* (2013.01); *F02N 11/0844* (2013.01); *F02N 19/004* (2013.01); *F02D 2250/06* (2013.01); *F02N 2200/022* (2013.01); *F02N 2250/04* (2013.01); *Y02T 10/40* (2013.01)

(58) Field of Classification Search
    CPC ............... F02D 41/065; F02D 2250/04; F02D 2250/06; F02N 11/0844; F02N 19/004; F02N 2250/04; F02N 2250/06; F02N 2200/022; Y02T 10/40
    USPC ........................................................ 701/102
    See application file for complete search history.

(56) References Cited

U.S. PATENT DOCUMENTS

| | | | |
|---|---|---|---|
| 2007/0028880 A1* | 2/2007 | Yuya | ........................ F02N 11/08 123/179.3 |
| 2007/0261668 A1 | 11/2007 | Kataoka et al. | |
| 2010/0114462 A1 | 5/2010 | Gibson et al. | |
| 2011/0239974 A1* | 10/2011 | Shoda | ................... F02D 41/0002 123/179.4 |
| 2011/0295495 A1 | 12/2011 | Ma et al. | |
| 2013/0179054 A1 | 7/2013 | Calva et al. | |
| 2013/0180503 A1 | 7/2013 | Calva et al. | |
| 2013/0296126 A1* | 11/2013 | Gibson | ................... H02J 7/1446 477/5 |
| 2015/0133267 A1* | 5/2015 | Ito | .......................... F16D 48/066 477/169 |
| 2015/0298700 A1 | 10/2015 | Kuroki et al. | |

FOREIGN PATENT DOCUMENTS

| | | |
|---|---|---|
| DE | 10 2010 040 562 A1 | 3/2012 |
| DE | 10 2011 090 149 A1 | 7/2013 |
| GB | 2517751 A | 3/2015 |
| JP | 10-47104 A | 2/1998 |
| JP | 2000-257458 A | 9/2000 |
| JP | 2002-115579 A | 4/2002 |
| JP | 2006-77605 A | 3/2006 |
| JP | 2006-200370 A | 8/2006 |
| JP | 2008-232054 A | 10/2008 |
| JP | 2010-53764 A | 3/2010 |
| JP | 2011-75011 A | 4/2011 |
| JP | 2011-208583 A | 10/2011 |
| JP | 2012-237218 A | 12/2012 |
| JP | 2014-238101 A | 12/2014 |
| WO | WO 2005/121531 A1 | 12/2005 |
| WO | WO 2014/068718 A1 | 5/2014 |

OTHER PUBLICATIONS

Japanese-language Written Opinion (PCT/ISA/237) issued in PCT Application No. PCT/JP2016/066529 dated Sep. 13, 2016 (Four (4) pages).
European Extended Search Report issued in counterpart European Application No. 16814131.5 dated Nov. 26, 2018 (nine (9) pages).
Japanese-language Office Action issued in counterpart Japanese Application No. 2019-037648 dated Oct. 23, 2019 with English translation (five (5) pages).
Chinese-language Office Action issued in Chinese Application No. 201680035533.0 dated Mar. 31, 2020 with English translation (14 pages).

* cited by examiner

VEHICLE-MOUNTED CONTROL DEVICE

Technical Field

The present invention relates to a vehicle-mounted control device, and in particular to a control device of a vehicle that performs automatic stop and automatic start of an engine.

Background Art

In recent years, in order to improve a reduction in fuel consumption, engine automatic stop-start systems, each of which automatically stops an engine when a vehicle stops, and restarts the engine by a starting device (starter) when the vehicle starts, are put into widespread use. Moreover, PTL 1 proposes a technique in which when a predetermined engine automatic stop condition has been fulfilled (for example, a state in which an accelerator is not stepped on continues for a predetermined time period or longer) while the vehicle is traveling, an engine is automatically stopped, and a power transmission path between the engine and wheels is disconnected, which causes the vehicle to inertially travel with the speed kept unchanged as much as possible, thereby resulting in further reduction in fuel consumption.

When returning from such inertia traveling to normal traveling, it is necessary to increase an engine rotational frequency so as to be synchronized with a rotational frequency of the wheels, and then to connect the power transmission path by a transmission. Accordingly, under the influence of this operating time, when the accelerator is stepped on to request returning to normal traveling, a response of the accelerator deteriorates. PTL 2 proposes a traveling control device of a vehicle, the traveling control device being intended to enhance re-acceleration performance by, when returning from neutral inertia traveling to normal traveling, increasing the amount of intake air into a cylinder in comparison with when returning, to normal traveling, from cylinder deactivation inertia traveling that is traveling in which at least apart of cylinders of an engine is deactivated with the power transmission path connected.

CITATION LIST

Patent Literature

PTL 1: JP 2006-200370 A
PTL 2: WO 2014/068718

SUMMARY OF INVENTION

Technical Problem

In the inertia traveling in which an engine is automatically stopped, and in which a power transmission path between the engine and the wheels is disconnected, a request to return to normal traveling may be generated, before the engine completely stops, by an engine restart request based on: the accelerator operation of a driver; an automatic acceleration request at the time of automatic traveling; and an engine output request generated by, for example, the operation of an air conditioner. Meanwhile, at the time immediately before the complete stop, at which the engine inertially rotates resulting in a decrease in rotational frequency, there may occur a swing back (the reverse rotation with respect to the forward rotational direction of the engine) in which a piston is unable to complete a compression stroke, and consequently is pushed back. Therefore, when a restart request based on an engine output request is generated in this timing, increasing the amount of intake air into a cylinder causes the repulsive energy by the compressed air to increase before the top dead center of a cylinder that starts a compression stroke in comparison with a case where the intake air amount does not increase as disclosed in PTL 2. Therefore, when the piston has failed to complete a compression stroke, the repulsive force increases, which causes the reverse rotational frequency of the engine to increase.

In addition, when the engine is restarted before the complete stop, a low engine rotational frequency disables the engine to restart only by restarting fuel injection (combustion recovery), and therefore a starting device such as a starter is used to start restarting (cranking). In a case where the starter is used, when the engine rotational frequency at which the starter is capable of engaging with an engine is achieved, the starter is started to start cranking.

However, as described above, when a restart request based on an engine output request is generated before the engine completely stops, it is necessary to avoid a reverse rotation period of the engine before the starter is engaged from the viewpoint of the durability of the starter. In other words, the starter has to be started after the reverse rotation of the engine is settled. Therefore, there arises a problem that starting of starter starting is delayed from the time at which the restart request has been generated, and consequently a response of restarting and a response of acceleration deteriorate. Moreover, when the reverse rotational frequency of the engine increases after the starter is engaged with the engine, there arises a problem that when the driving force on the reverse rotation side by the repulsive force of the engine increases with respect to the driving force to the forward rotation side of the starter, cranking is disabled, which causes the engine to stop. Here, the above description has been made using the example in which the starter is used for starting. However, even when a starting motor is used, there arises a problem that when the reverse rotational frequency of the engine increases at the time of cranking, an excessive load is placed on the starting motor, and therefore a current of an allowable value or more flows, which leads to a burnout of a current circuit.

Furthermore, when a restart request based on an engine output request is generated before the engine completely stops, an increase in the intake air amount causes the rotation behavior of the engine to change in comparison with a case where the intake air amount does not increase. This produces a problem that the engine rotational frequency at the time of starting of starter starting decreases in comparison with the case where the intake air amount does not increase, and consequently cranking occurs during the reverse rotation of the engine.

The present invention has been made taking such problems into consideration, and an object of the present invention is to provide a vehicle-mounted control device that, when a restart request is generated during a time interval between the fulfillment of an engine automatic stop condition and the complete stop, decreases a charging efficiency of the engine to prevent an increase in the reverse rotational amount of the engine, and to prevent fluctuations in rotation of the engine, thereby ensuring the durability of the starting device of the engine, and preventing the responsiveness from deteriorating when a restart request based on an engine output request is generated.

Solution to Problem

In order to achieve the above-described object, the present invention provides a vehicle-mounted control device that controls a charging efficiency of an engine that automatically stops when a predetermined automatic stop condition is fulfilled, wherein a charging efficiency for a requested engine output amount at the time of restarting the engine on the basis of an engine output request generated during a predetermined time period from the fulfillment of the automatic stop condition until complete stop of the engine is lower than a charging efficiency for a requested engine output amount during a time period other than the predetermined time period.

Advantageous Effects of Invention

According to the present invention, it is possible to provide a vehicle-mounted control device that, when a restart request is generated during a time interval between the fulfillment of an engine automatic stop condition and the complete stop, decreases a charging efficiency of an engine to prevent an increase in the reverse rotational amount of the engine, or to prevent fluctuations in rotation, thereby ensuring the durability of the starting device of the engine, and preventing an accelerator response from deteriorating when a restart request based on the accelerator operation is generated. Objects, configurations, and effects, other than those described above, will be clarified by the following description of an embodiment.

DESCRIPTION OF EMBODIMENTS

An embodiment of the vehicle-mounted control device according to the present invention will be described in detail with reference to the accompanying drawings.

First Example

Figure 1:
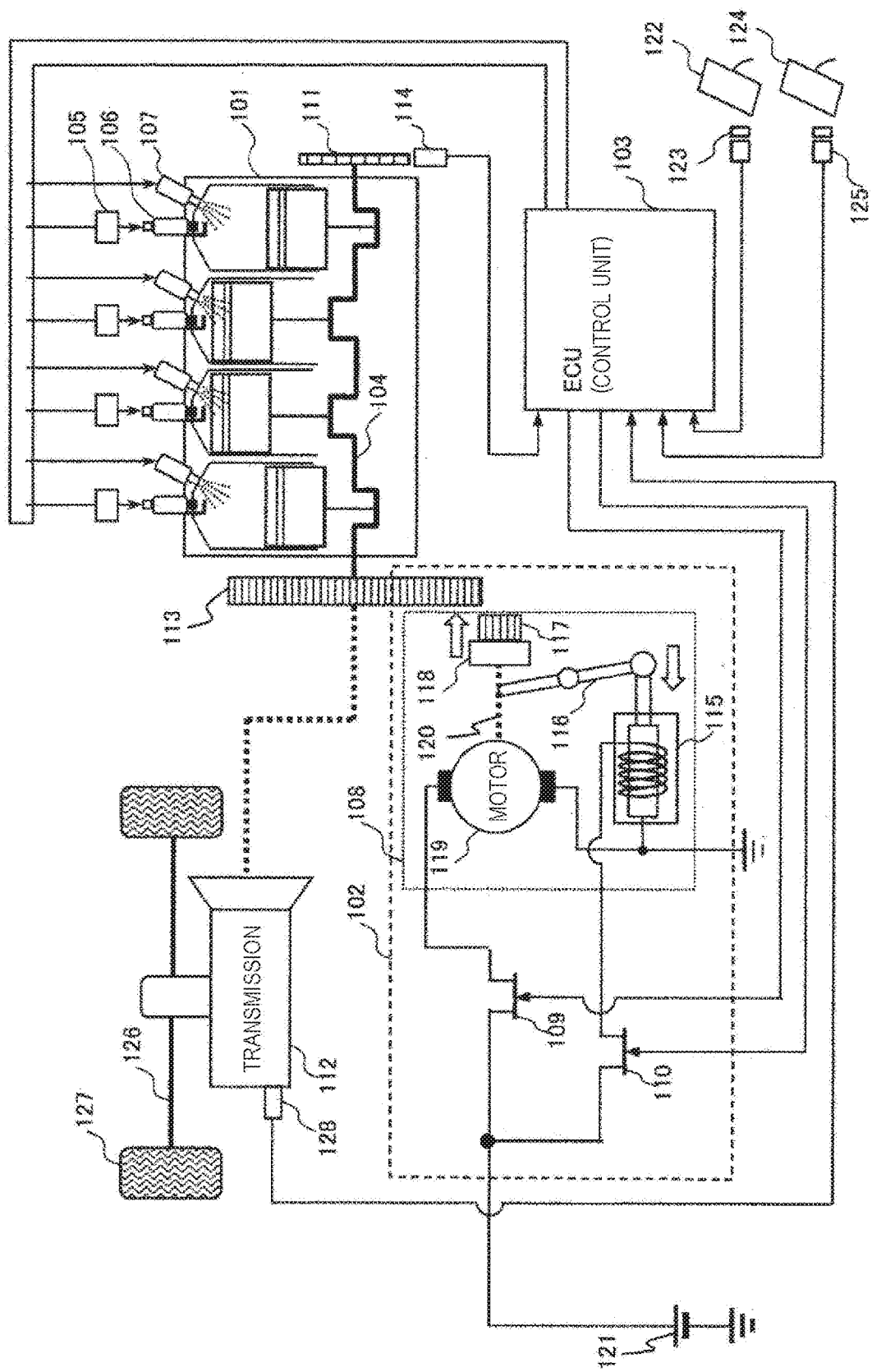
FIG. 1 shows, as an example, an overall configuration diagram of a vehicle that is equipped with a vehicle-mounted control device according to the present invention.

FIG. 1 shows, as an example, an overall configuration diagram of a vehicle that is equipped with a vehicle-mounted control device according to the present invention. FIG. 1 shows an example in which a starter that is capable of pushing out a pinion gear, and is capable of driving a motor, is mounted as a starting device. The present vehicle is provided with a multi-cylinder engine (an internal combustion engine main body) 101, an engine automatic stop-start system 102, and an ECU (a control unit, a control device) 103.

The engine 101 includes a crank shaft 104, and an ignition coil 105, a spark plug 106, a fuel injection valve 107 and the like are mounted to the engine 101. The engine 101 functions as a power source that generates a driving force for causing the vehicle to travel. The engine automatic stop-start system 102 is provided with a pinion-gear push-out type starter (a starting device) main body 108, a first semiconductor switching element 109, and a second semiconductor switching element 110. The engine automatic stop-start system 102 is controlled by the ECU 103.

It should be noted that the first semiconductor switching element 109 and the second semiconductor switching element 110 may be replaced with respective mechanical magnet switches that operate according to ON and OFF signals. A signal plate 111 on which a predetermined pattern is drawn so as to detect a crank angle signal is mounted to one end of the crank shaft 104, and a ring gear 113 that is integral with a drive plate, and transfers a driving force to a transmission 112, is mounted to the other end thereof. A crank angle sensor 114 that detects projections and depressions of the pattern to output a pulse signal is mounted in proximity to the signal plate 111, and the ECU 103 calculates a rotational frequency (engine rotational frequency) of the engine 101 on the basis of the pulse signal output from the crank angle sensor 114.

The engine automatic stop-start system 102 is provided with a starter solenoid 115, a pinion transfer lever 116, a pinion gear 117, a one-way clutch 118, and a starter motor 119. The pinion gear 117 is a gear that is capable of engaging with the ring gear 113. The pinion gear 117 is set so as to be capable of moving in a direction of a pinion shaft 120 of the starter motor 119 through the one-way clutch 118. The starter solenoid 115 is an electrically-driven actuator that moves the pinion gear 117 in a direction of the pinion shaft 120 through the pinion transfer lever 116. The starter motor 119 is a motor for cranking the engine 101 as described below.

When a pinion transfer instruction is input into a gate terminal of the second semiconductor switching element 110 from the ECU 103, the electric power of a battery 121 is supplied to the starter solenoid 115. As the result, the starter solenoid 115 moves the pinion gear 117 in the rightward direction shown in the figure through the pinion transfer lever 116, and consequently the pinion gear 117 engages with the ring gear 113. In addition, when a motor driving instruction from the ECU 103 is input into a gate terminal of the first semiconductor switching element 109, the electric power of the battery 121 is supplied to the starter motor 119. As the result, the starter motor 119 rotates the crank shaft 104 through the pinion gear 117 and the ring gear 113 to crank the engine 101. The pinion transfer instruction and the motor driving instruction are determined on the basis of a signal of the accelerator opening degree sensor 123 for detecting the amount of stepping (degree of opening) of the accelerator pedal 122, a signal of a brake switch 125 for detecting whether or not stepping on a brake pedal 124 is allowed, and a rotational frequency of the engine 101.

In addition, the transmission 112 transfers a rotational driving force generated by the engine 101 to a road surface through a drive shaft 126 and tires 127. Moreover, a vehicle speed sensor 128 for detecting a rotation pulse of the output shaft is mounted to the transmission 112, and the ECU 103 calculates a vehicle speed on the basis of an output signal from the vehicle speed sensor 128.

Figure 2:
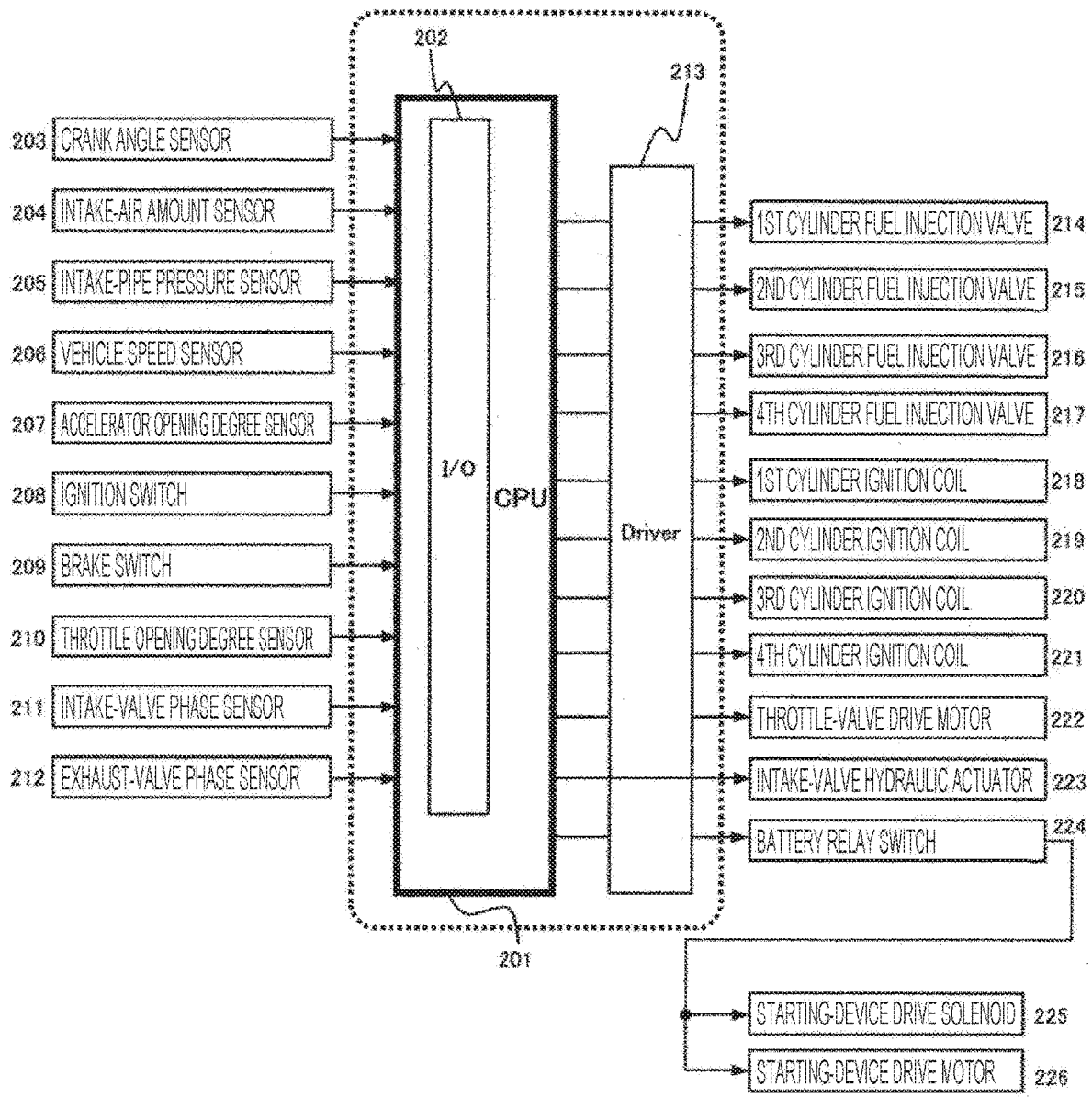
FIG. 2 shows, as an example, an internal configuration of the vehicle-mounted control device according to the present invention.

FIG. 2 shows, as an example, an internal configuration of a vehicle-mounted control device targeted by the present invention. An I/O (Input/Output) part 202 is set inside a CPU (Central Processing Unit) 201. The I/O part 202 converts an electric signal of each sensor disposed in the engine into a signal for digital operation processing, and converts a control signal for digital operation into an actual actuator driving signal. The I/O part 202 receives inputs from the crank angle sensor 114, an intake-air amount sensor 204, an intake-pipe pressure sensor 205, the vehicle speed sensor 128, the accelerator opening degree sensor 123, an ignition switch 208, the brake switch 125, a throttle opening degree sensor 210, an intake-valve phase sensor 211, and an exhaust-valve phase sensor 212. Output signals from the CPU 201 are input into a driver circuit 213. The driver circuit 213 drives a starting-device drive solenoid 225 and a starting-device drive motor 226 by a current through fuel injection valves 214 to 217, ignition coils 218 to 221, a throttle-valve drive motor 222, an intake-valve hydraulic actuator 223, and a battery relay switch 224.

Figure 3:
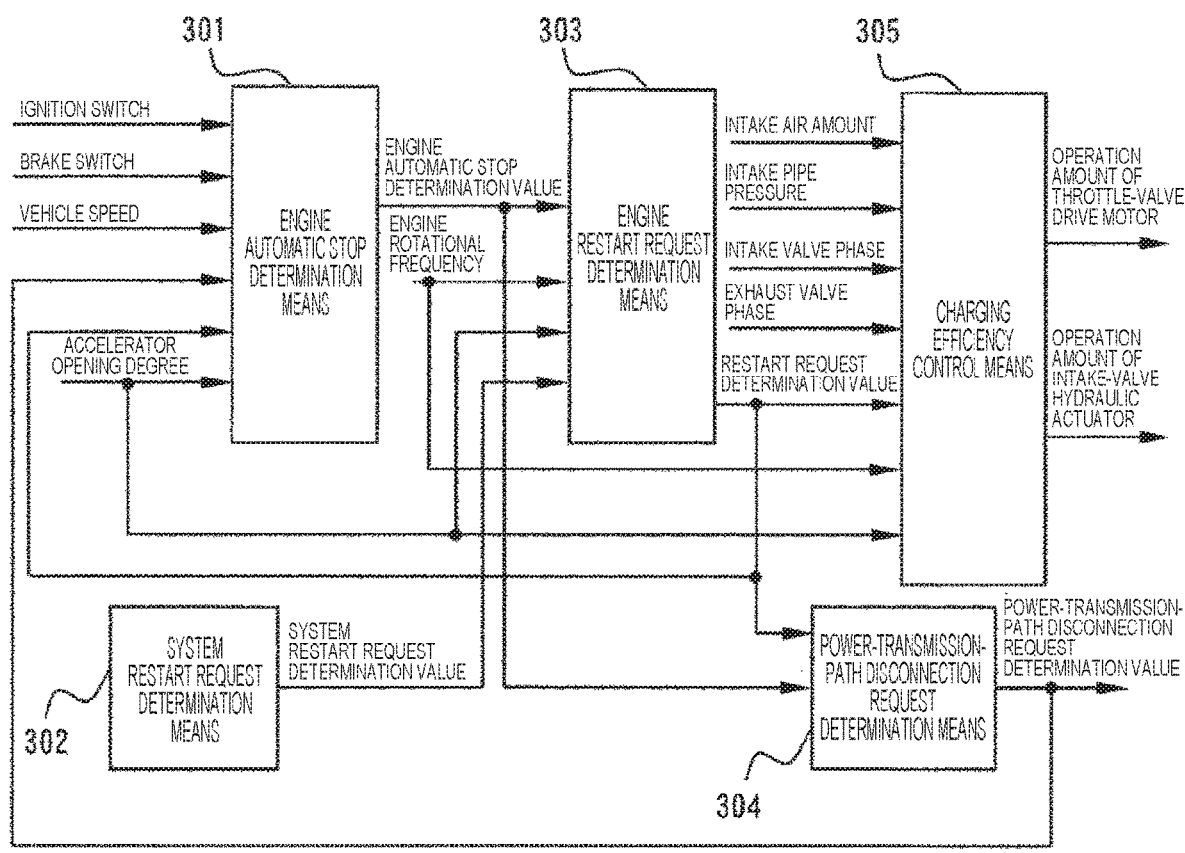
FIG. 3 shows, as an example, a configuration of a control block of the vehicle-mounted control device according to the present invention.

FIG. 3 shows, as an example, a configuration of a control block of the vehicle-mounted control device targeted by the present invention. In a block 301, engine automatic stop is determined by the ignition switch, the brake switch, a vehicle speed, an accelerator opening degree, an engine restart request determination value determined in the undermentioned block 303, and a power-transmission-path disconnection request determination value determined in the undermentioned block 304.

In a block 302, a system restart request is determined. In this block, during engine automatic stop, a determination is made as to whether or not an event other than the accelerator operation by a driver requires starting of the engine, the event including at least one of: with respect to parts and functions of the vehicle system, performance has decreased or an abnormality has been detected; a request to operate an air conditioner has been generated: a power generation request has been generated; and a request to increase the deceleration of the vehicle has been generated on the basis of outside recognition information in order to avoid collision with an object ahead of the vehicle.

In a block 303, an engine restart request is determined by an accelerator opening degree, an engine rotational frequency, an engine automatic stop determination value, and a system restart request determination value. In a block 304, a power-transmission-path disconnection request is determined by an engine automatic stop determination value and an engine restart request determination value. In this block, a determination is made as to whether or not a request to disconnect the power transmission path between the engine and the wheels to cause the vehicle to perform inertia traveling has been generated. The result thereof is transmitted to a control unit (unit) on the transmission side. The unit on the transmission side performs the control of an optimum change gear ratio on the basis of information on the engine side (the engine rotational frequency, the vehicle speed, the throttle opening degree) including this determination result, and information on the transmission side. In a block 305, a charging efficiency of the engine is controlled by an intake air amount, an intake pipe pressure, an intake valve phase, an exhaust valve phase, an engine restart request determination value, an accelerator opening degree, and an engine rotational frequency. The charging efficiency described here is a value that is obtained, for example, by dividing mass of air sucked into the cylinder of the engine by mass of air under standard conditions equivalent to stroke volume.

Therefore, the operation amount of the throttle-valve drive motor and the operation amount of the intake-valve hydraulic actuator, which are required for the control, are determined. In this block, when the charging efficiency is controlled by the operation of the throttle-valve drive motor, a wide control range is obtained; and when the charging efficiency is controlled by the operation of the intake-valve hydraulic actuator, the control with quick responsiveness becomes possible. Therefore, it is preferable to operate the throttle-valve drive motor or the intake-valve hydraulic actuator properly in consideration of the above feature. The reason is that when the charging efficiency is controlled by using the throttle valve, a response delay of the intake air occurs due to the collector volume of the intake pipe, and therefore controlling the intake valve is more advantageous from the viewpoint of the responsiveness.

Moreover, when at least one of an EGR gas, a purge gas and a charging pressure is controlled, a reverse rotation phenomenon of the engine, the charging efficiency of which may be controlled, occurs not only in fresh intake air but also in a general gas. Therefore, similar effects can be achieved for a request to increase the EGR gas or the purge gas too.

In addition, when the throttle-valve drive motor or an intake and exhaust valve hydraulic actuator is controlled, a charging efficiency may be controlled by any of a valve opening degree and the operation timing.

Figure 4:
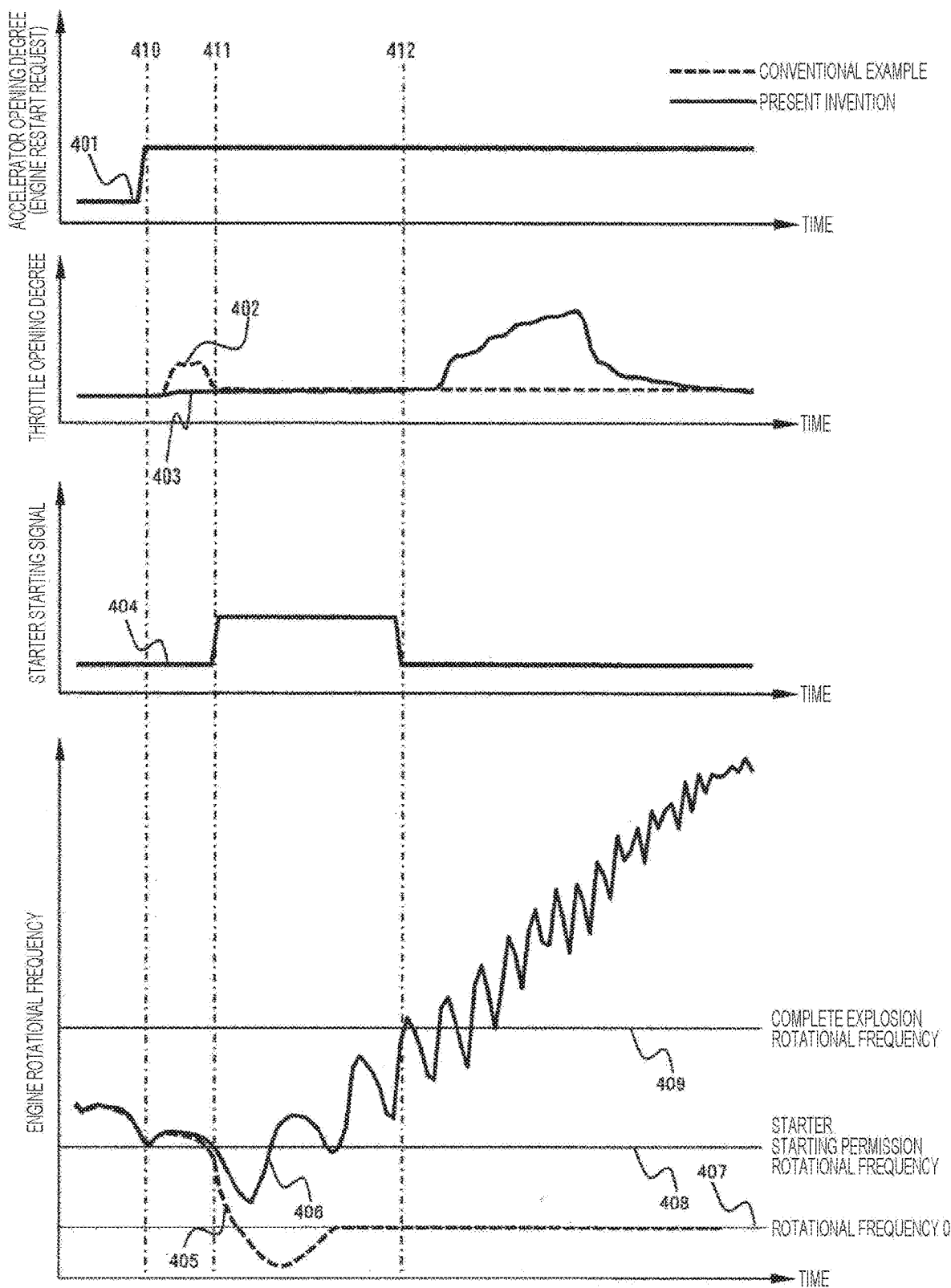
FIG. 4 shows, as an example, behavior of an engine rotational frequency in a case where when a restart request is generated during a time interval between the fulfillment of an engine automatic stop condition and complete stop, an engine is restarted by decreasing a charging efficiency of the engine in the vehicle-mounted control device according to the present invention.

FIG. 4 shows an example in which when a restart request has been generated during a time interval between the fulfillment of an engine automatic stop condition and complete stop, the engine is restarted by decreasing a charging efficiency of the engine in the vehicle-mounted control device targeted by the present invention. A line 401 indicates an accelerator opening degree as an engine restart request; a line 402 indicates a throttle opening degree in the conventional example; a line 403 indicates a throttle opening degree in the present invention; a line 404 indicates a starter starting signal; a line 405 indicates an engine rotational frequency in the conventional example; a line 406 indicates an engine rotational frequency in the present invention; a line 407 indicates that an engine rotational frequency is 0; a line 408 indicates a starter starting permission rotational frequency based on the engine rotational frequency that enables the starter to engage with the engine; and a line 409 indicates a complete explosion rotational frequency used to determine a complete explosion state after restarting of the engine. At the time 410, while the automatic stop condition of the engine is fulfilled, when the restart request 401 has been fulfilled on the basis of the accelerator opening degree, the charging efficiency of the engine is increased by the throttle opening degree 402 based on the accelerator opening degree 401 in the conventional example in order to increase the engine rotational frequency that is decreasing toward complete stop.

Meanwhile, in the present invention, the charging efficiency of the engine is decreased by the throttle opening degree 403 that is lower than the throttle opening degree 402. Next, at the time 411, the starter starting signal 404 is caused to be fulfilled. Incidentally, with respect to this starting timing, in consideration of the response time until the pinion gear 117 of the starter shown in FIG. 1 engages with the ring gear 113, an estimated value of the engine rotational frequency after the time equivalent to the response time is determined on the basis of the engine rotational frequency 405 in the conventional example, and on the basis of the engine rotational frequency 406 in the present invention, and the starter starting signal 404 may be caused to be fulfilled when this estimated value reaches the starter starting permission rotational frequency 408.

At the time 411, in the conventional example, the charging efficiency of the engine increases by the throttle opening degree 402, and therefore the rotation behavior of the engine changes, which speeds up a decrease in rotation. As the result, the timing in which the starter starting condition is fulfilled is delayed. In addition, after engagement caused by the fulfillment of the starting condition, when the engine rotational frequency 405 reaches 0 in the line 407, the charging efficiency increases by the throttle opening degree 402, and therefore a compression stroke cannot be completed, causing the repulsive force to increase. When the repulsive force exceeds the driving force to the forward rotation side of the starter, cranking is disabled after engagement.

Meanwhile, in the present invention, decreasing the charging efficiency of the engine by the throttle opening degree 403 enables to suppress a change in the rotation behavior. Therefore, a delay in the fulfillment of the starter starting condition, and a delay in the engagement between the pinion gear and the ring gear, can be prevented. In addition, when the engine rotational frequency reaches 0 after the engagement caused by the fulfillment of the starting condition, even in a case where a compression stroke cannot be completed, the repulsive force does not increase because the charging efficiency is decreased. Therefore, restarting by cranking is ensured.

Subsequently, in the present invention, at the time 412, when the engine rotational frequency 406 reaches the complete explosion rotational frequency 409, the fulfillment of the starter starting signal 404 is disabled, and the charging efficiency of the engine is increased by the throttle opening degree 403 based on the accelerator opening degree 401, thereby preventing a response of the accelerator from deteriorating.

It should be noted that even on the condition that the ring gear is engaged with the pinion gear, the increase in the charging efficiency of the engine prevents a delay in the fulfillment of the starter starting condition, and a delay in the engagement between the pinion gear and the ring gear, which enables to quickly increase the engine rotational frequency after the fulfillment of the engagement.

As described above, as indicated by the throttle opening degree 403 in the present invention, operating in a closing direction with respect to the accelerator opening degree 401 is effective for decreasing the occurrence frequency of reverse rotation phenomenon and the reverse rotational frequency. Accordingly, it is preferable to select the operation amount of the throttle opening degree as appropriate according to the balance between a required accelerator response and a degree of combustion explosive force.

Figure 5:
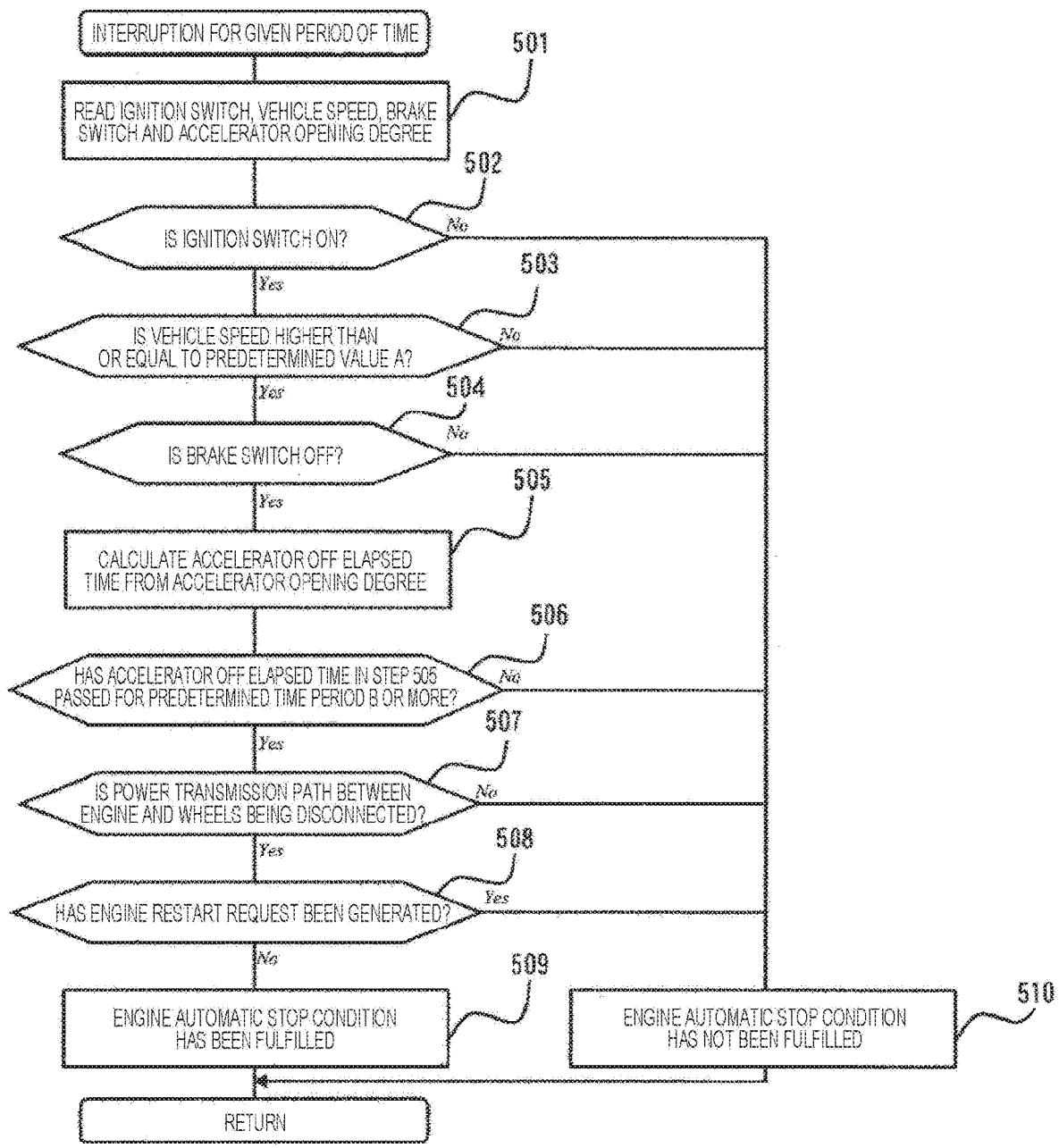
FIG. 5 shows, as an example, a flowchart of a block 301 of the vehicle-mounted control device according to the present invention.

FIG. 5 shows, as an example, a flowchart of the block 301 shown in FIG. 3 related to the vehicle-mounted control device targeted by the present invention. In step 501, an ignition switch, a vehicle speed, an accelerator opening degree and a brake switch are read. In step 502, a determination is made as to whether or not the ignition switch is ON. When the result of the determination is "YES", the process proceeds to the undermentioned step 503. In the other cases, the process proceeds to the undermentioned step 510. In step 503, a determination is made as to whether or not the vehicle speed is higher than or equal to a predetermined value A. When the result of the determination is "YES", the process proceeds to the undermentioned step 504. In the other cases, the process proceeds to the undermentioned step 510. Incidentally, a value set as the predetermined value A is, for example, a value by which it is determined that the engine is automatically stopped, and the power transmission path between the engine and the wheels is then disconnected to perform the inertia traveling of the vehicle.

In step 504, a determination is made as to whether or not the brake switch is ON. When the result of the determination is "YES", the process proceeds to the undermentioned step 505. In the other cases, the process proceeds to the undermentioned step 510. In step 505, the accelerator OFF elapsed time is calculated from the accelerator opening degree. When the accelerator is ON, the elapsed time is reset to 0. In step 506, a determination is made as to whether or not the accelerator OFF elapsed time calculated in step 505 has passed for a predetermined time period B or more. When the result of the determination is "YES", the process proceeds to the undermentioned step 507. In the other cases, the process proceeds to the undermentioned step 510. Incidentally, a value set as the predetermined time period B is, for example, a value by which it is determined that an accelerator OFF state of the driver is not caused by shifting to brake ON.

In step 507, a determination is made as to whether or not the power transmission path between the engine and the wheels is being disconnected. When the result of the determination is "YES", the process proceeds to the undermentioned step 508. In the other cases, the process proceeds to the undermentioned step 510. In step 508, a determination is made as to whether or not an engine restart request has been generated. When the result of the determination is "YES", the process proceeds to the undermentioned step 510. In the other cases, the process proceeds to the undermentioned step 509. In step 509, it is determined that the engine automatic stop condition has been fulfilled. Fuel injection is then stopped on the basis of this determination. In step 510, it is determined that the engine automatic stop condition has not been fulfilled. On the basis of this determination, when it is determined that the fuel injection is being stopped, the fuel injection is restarted.

Figure 6:
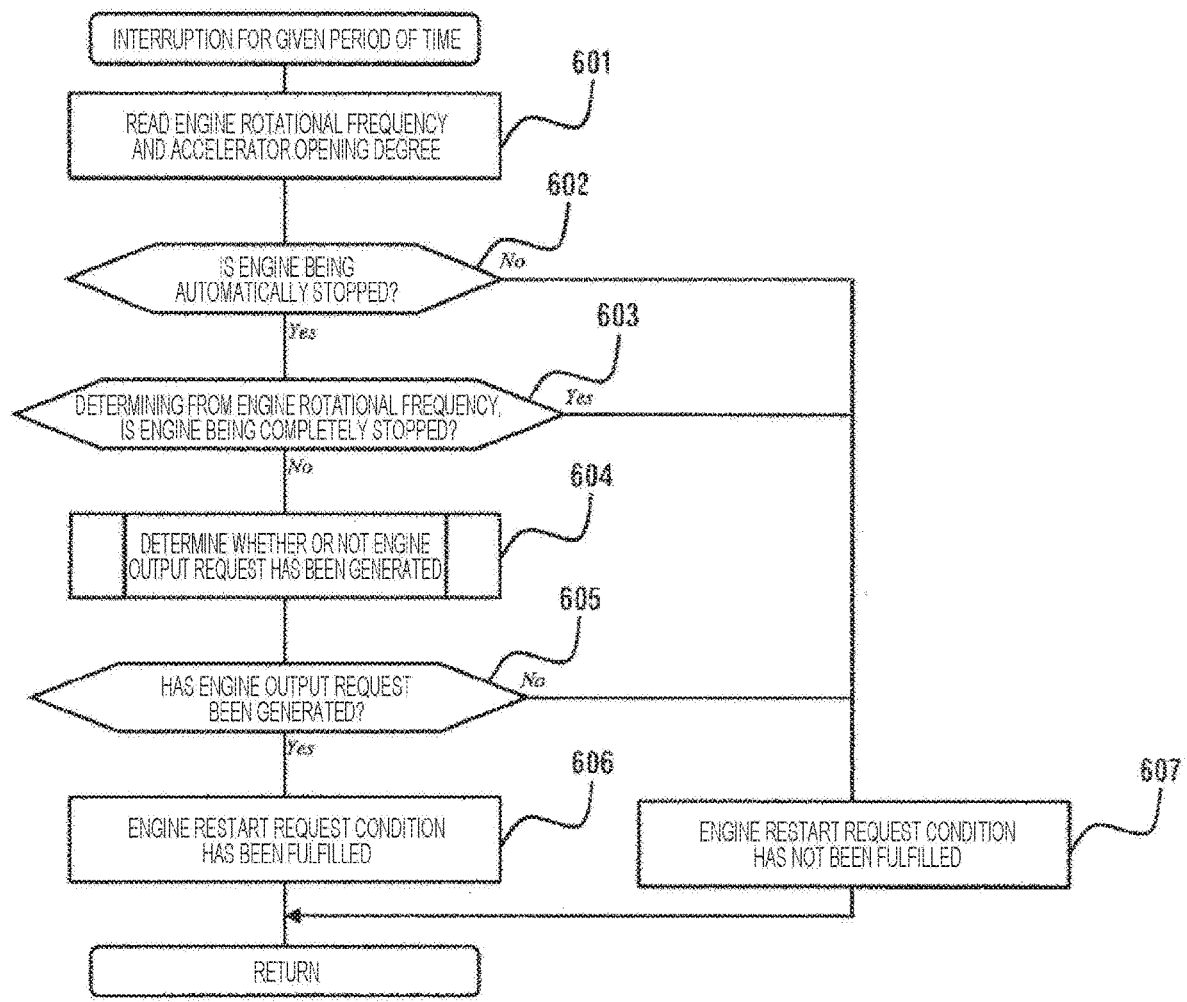
FIG. 6 shows, as an example, a flowchart of a block 303 of the vehicle-mounted control device according to the present invention.

FIG. 6 shows, as an example, a flowchart of the block 303 shown in FIG. 3 related to the vehicle-mounted control device targeted by the present invention. In step 601, an engine rotational frequency and an accelerator opening degree are read. In step 602, a determination is made as to whether or not the engine is being automatically stopped. When the result of the determination is "YES", the process proceeds to the undermentioned step 603. In the other cases, the process proceeds to the undermentioned step 607.

In step 603, a determination is made, from the engine rotational frequency, as to whether or not the engine is being completely stopped. When the result of the determination is "YES", the process proceeds to the undermentioned step 607. In the other cases, the process proceeds to the undermentioned step 604. In step 604, a determination is made as to whether or not an engine output request has been generated.

In step 605, a determination is made as to whether or not an engine output request has been generated. When the result of the determination is "YES", the process proceeds to the undermentioned step 606. In the other cases, the process proceeds to the undermentioned step 607. In step 606, it is determined that the engine restart request condition has been fulfilled. In step 607, it is determined that the engine restart request condition has not been fulfilled.

Figure 7:
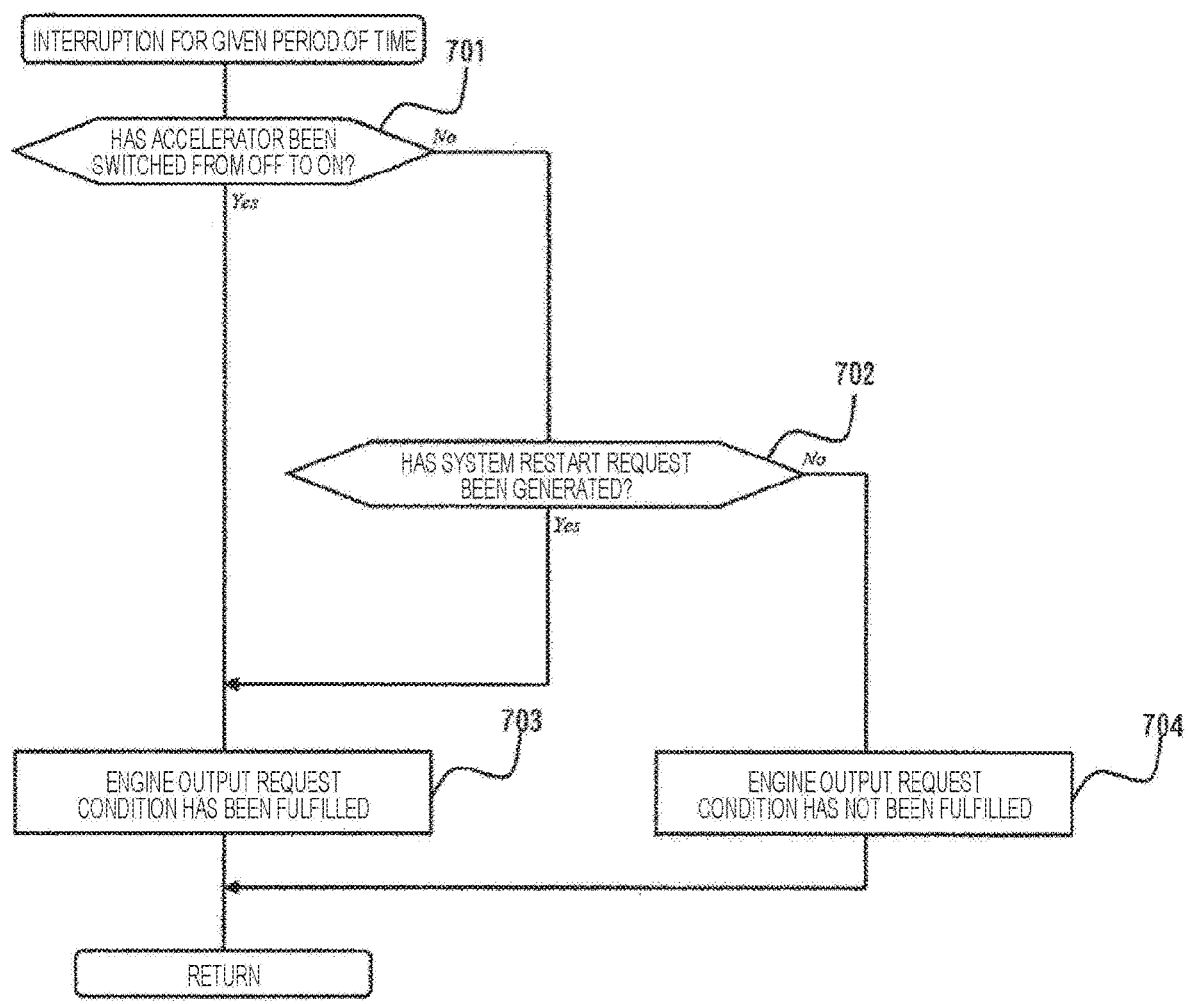
FIG. 7 shows, as an example, a flowchart of step 604 of the vehicle-mounted control device according to the present invention.

FIG. 7 shows, as an example, a flowchart of step 604 in the flowchart shown in FIG. 6 related to the vehicle-mounted control device targeted by the present invention. In step 701, a determination is made as to whether or not the accelerator has been switched from OFF to ON. When the result of the determination is "YES", the process proceeds to the undermentioned step 703. In the other cases, the process proceeds to the undermentioned step 704. In step 702, a determination is made as to whether or not a system restart request has been generated. When the result of the determination is "YES", the process proceeds to the undermentioned step 703. In the other cases, the process proceeds to the undermentioned step 704. In step 703, it is determined that the engine output request condition has been fulfilled. In step 704, it is determined that the engine output request condition has not been fulfilled.

Figure 8:
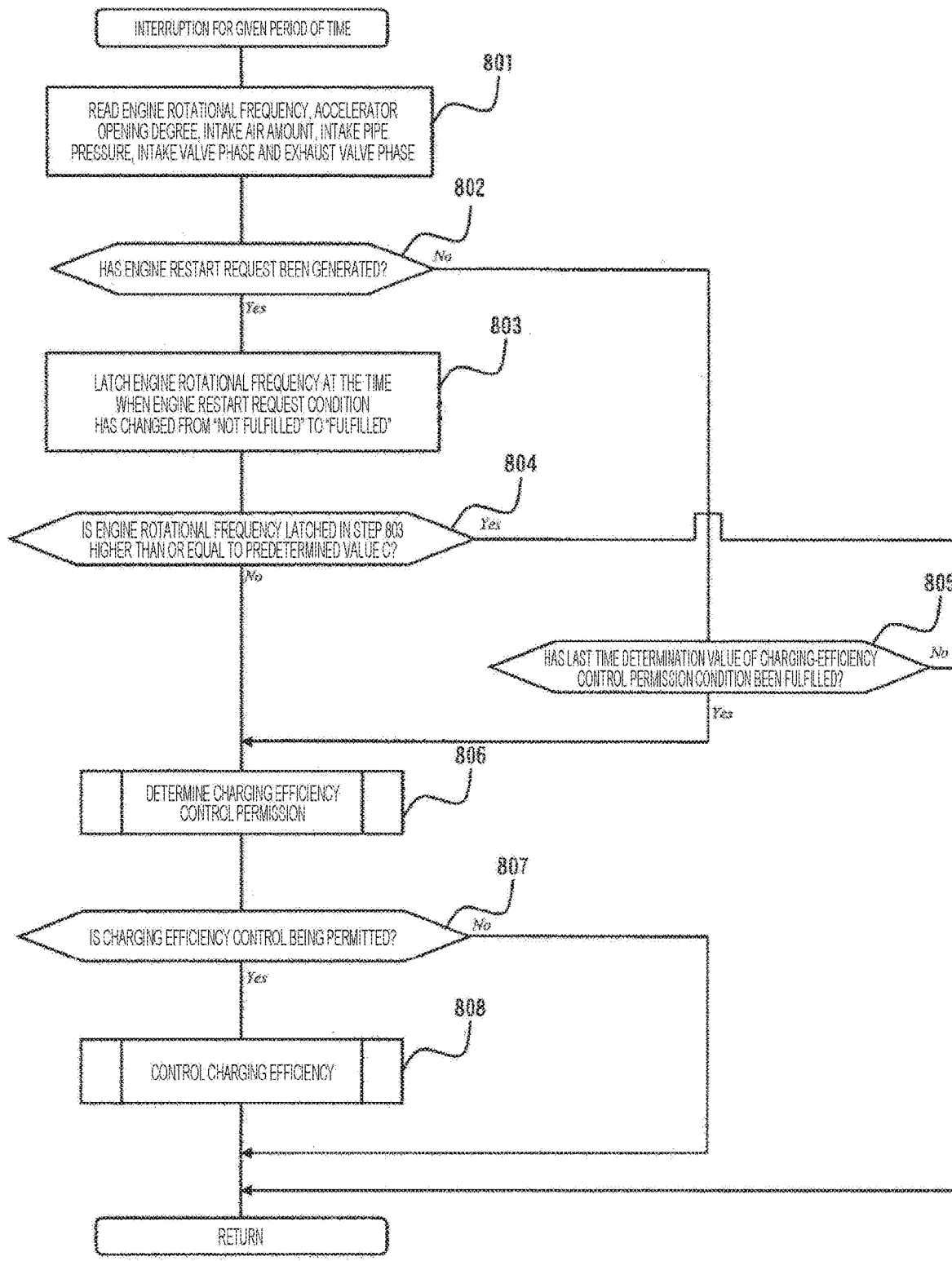
FIG. 8 shows, as an example, a flowchart of a block 305 of the vehicle-mounted control device according to the present invention.

FIG. 8 shows, as an example, a flowchart of the block 305 shown in FIG. 3 related to the vehicle-mounted control device targeted by the present invention. In step 801, an engine rotational frequency, an accelerator opening degree, an intake air amount, an intake pipe pressure, an intake valve phase and an exhaust valve phase are read. In step 802, a determination is made as to whether or not an engine restart request has been generated. When the result of the determination is "YES", the process proceeds to the undermentioned step 803. In the other cases, in other cases, the process proceeds to the undermentioned step 805.

In step 803, an engine rotational frequency at the time when the engine restart request condition has changed from "not fulfilled" to "fulfilled" is latched. In step 804, a determination is made as to whether or not the engine rotational frequency latched in step 803 is higher than or equal to a predetermined value C. When the result of the determination is "YES", the processing of this flowchart ends without performing specific processing. In the other cases, the process proceeds to the undermentioned step 806.

Incidentally, a value set as the predetermined value C is, for example, a value by which it is determined that the engine can be restarted only by means of combustion recovery without using the starter. When a restart request has been generated, in order to release an engine stop state, fuel injection is restarted from a cylinder that is capable of fuel injection. When the engine inertia rotation time is short, and when the engine rotational frequency is high, the engine can be restarted only by means of combustion. The possibility of restarting the engine increases with the increase in the intake air amount of the cylinders. Accordingly, in this case, it is not necessary to limit the charging efficiency. However, when the engine inertia rotation time is long, and when the engine rotational frequency is low, the engine cannot be restarted only by means of combustion even when the fuel injection is restarted. Therefore, in the timing in which starting by the starter is required, it is necessary to limit the charging efficiency.

In step 805, a determination is made as to whether or not a last time determination value of a charging-efficiency control permission condition has been fulfilled. When the result of the determination is "YES", the process proceeds to the undermentioned step 806. In the other cases, the processing of this flowchart ends without performing specific processing.

In addition, the example has been shown here, in which whether or not the engine can be restarted by the combustion recovery is determined by comparing the engine rotational frequency at the time when the engine restart request condition has been fulfilled with the predetermined value C. However, the following process may be used: checking an engine rotational frequency, a change in engine rotational frequency, and the like, which have been obtained when the fuel injection is restarted after the engine restart request is generated, so as to determine the fulfillment of the combustion recovery; and only when the combustion recovery is not fulfilled, restarting the engine by the starter, and then proceeding to the above-described step 806.

Incidentally, when the engine can be started by push-start by using the energy of the vehicle that is inertially traveling with the power transmission path between the engine and the wheels connected, the engine is compulsorily rotated in the forward direction by the kinetic energy of the vehicle, and thus it is not necessary to limit the occurrence of reverse rotation. Therefore, it may be configured not to limit the charging efficiency.

In step 806, a charging efficiency control permission is determined. In step 807, a determination is made as to whether or not the charging efficiency control is being permitted. When the result of the determination is "YES", the process proceeds to the undermentioned step 808. In the other cases, the processing of this flowchart ends without performing specific processing. In step 808, the charging efficiency is controlled.

Figure 9:
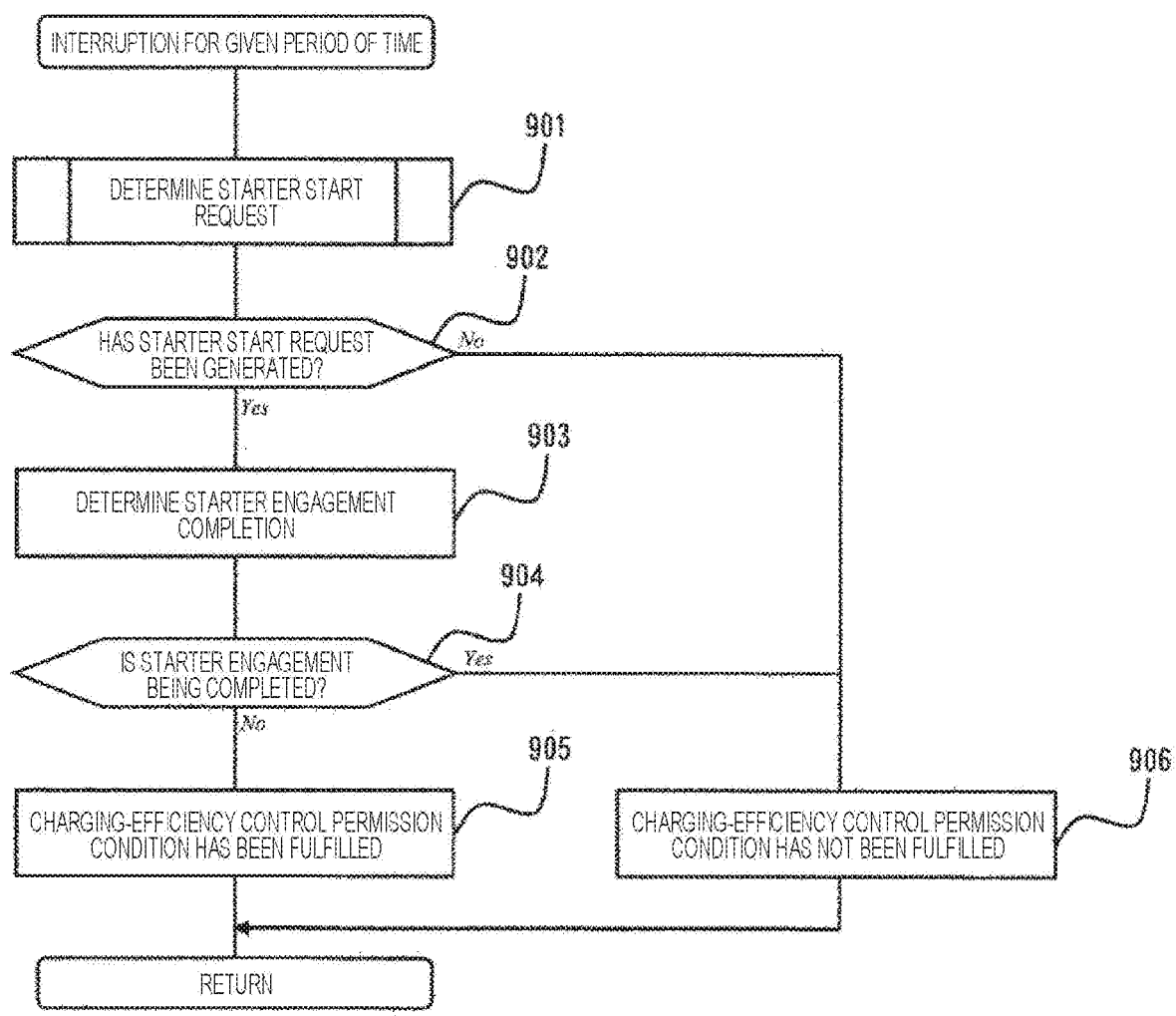
FIG. 9 shows, as an example, a flowchart of step 806 of the vehicle-mounted control device according to the present invention.

FIG. 9 shows, as an example, a flowchart of step 806 in the flowchart shown in FIG. 8 related to the vehicle-mounted control device targeted by the present invention. In step 901, a starter start request is determined. In step 902, a determination is made as to whether or not a starter start request has been generated. When the result of the determination is "YES", the process proceeds to the undermentioned step 903. In the other cases, the process proceeds to the undermentioned step 906. In step 903, a starter engagement completion is determined. In this step, after a starter start request is generated, a determination is made as to whether or not the engagement of the pinion gear 117 with the ring gear 113 shown in FIG. 1 has been completed. Therefore, for example, when the behavior of the engine rotation changes from the decrease side to the increase side, or when a voltage of the battery 121 temporarily decreases at the time of starting the motor 119 shown in FIG. 1, the determination may be made on the basis of the event.

In step 904, a determination is made as to whether or not starter engagement is being completed. When the result of the determination is "YES", the process proceeds to the undermentioned step 906. In the other cases, the process proceeds to the undermentioned step 905. In step 905, it is determined that the charging-efficiency control permission condition has been fulfilled. In step 906, it is determined that the charging-efficiency control permission condition has not been fulfilled.

Figure 10:
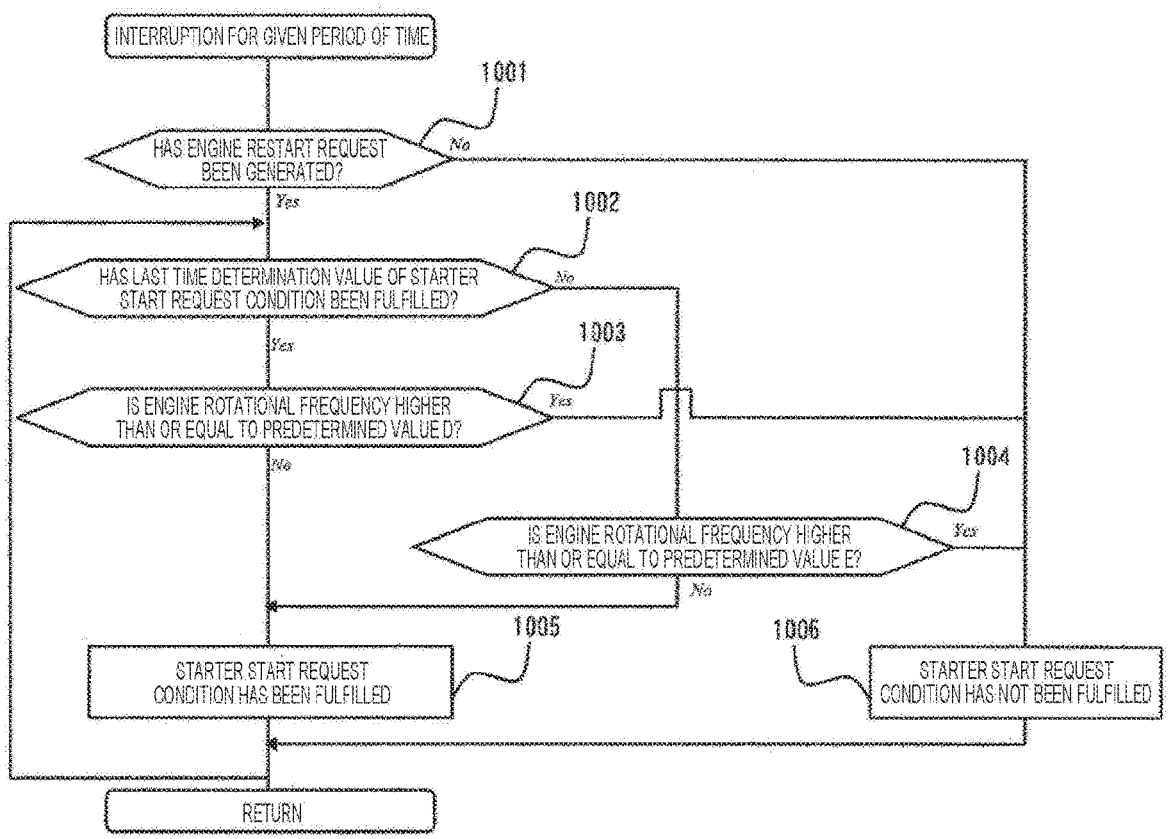
FIG. 10 shows, as an example, a flowchart of step 901 of the vehicle-mounted control device according to the present invention.

FIG. 10 shows, as an example, a flowchart of step 901 in the flowchart shown in FIG. 9 related to the vehicle-mounted control device targeted by the present invention. In step 1001, a determination is made as to whether or not an engine restart request has been generated. When the result of the determination is "YES", the process proceeds to the undermentioned step 1002. In the other cases, the process proceeds to the undermentioned step 1006. In step 1002, a determination is made as to whether or not a last time determination value of a starter start request condition has been fulfilled. When the result of the determination is "YES", the process proceeds to the undermentioned step 1003. In the other cases, the process proceeds to the undermentioned step 1004.

In step 1003, a determination is made as to whether or not the engine rotational frequency is higher than or equal to a predetermined value D. When the result of the determination is "YES", the process proceeds to the undermentioned step 1006. In the other cases, the process proceeds to the undermentioned step 1005. A value set as the predetermined value D is, for example, a value by which it is determined that the engine is in a complete explosion state. In step 1004, a determination is made as to whether or not the engine rotational frequency is higher than or equal to a predetermined value E. When the result of the determination is "YES", the process proceeds to the undermentioned step 1006. In the other cases, the process proceeds to the undermentioned step 1005.

A value set as the predetermined value E is, for example, a value by which it is determined that cranking can be performed by the starter, and further that with respect to the engagement between the starter and the engine, an influence exerted on the durability of the pinion gear 117 and the ring gear 113 shown in FIG. 1 can be reduced. In step 1005, it is determined that the starter start request condition has been fulfilled. In step 1006, it is determined that the starter start request condition has not been fulfilled.

Figure 11:
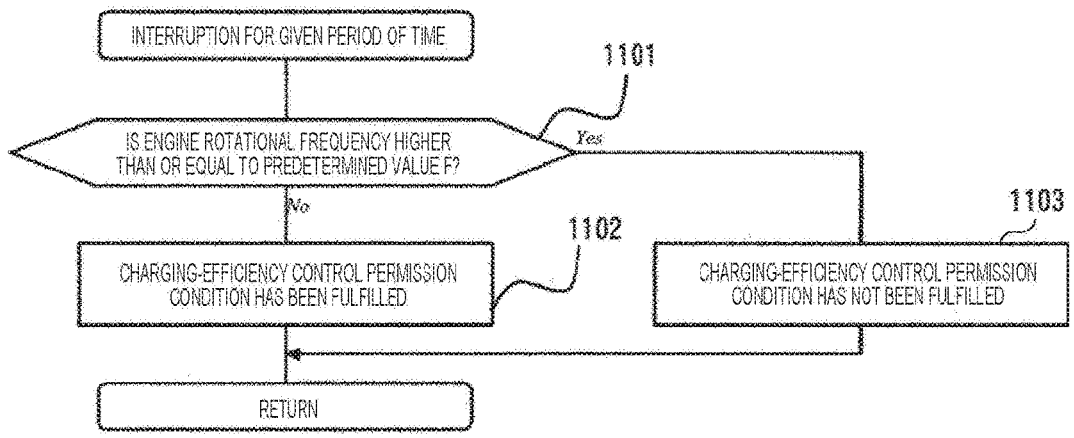
FIG. 11 shows, as an example, a flowchart of step 806 of the vehicle-mounted control device according to the present invention.

FIG. 11 shows, as an example, a flowchart of step 806 in the flowchart shown in FIG. 8 related to the vehicle-mounted control device targeted by the present invention. In step 1101, a determination is made as to whether or not the engine rotational frequency is higher than or equal to a predetermined value F. When the result of the determination is "YES", the process proceeds to the undermentioned step 1103. In the other cases, the process proceeds to the undermentioned step 1102. A value set as the predetermined value F is, for example, a value by which it is determined that the engine is in a complete explosion state. In step 1102, it is determined that the charging-efficiency control permission condition has been fulfilled. In step 903, it is determined that the charging-efficiency control permission condition has not been fulfilled.

Figure 12:
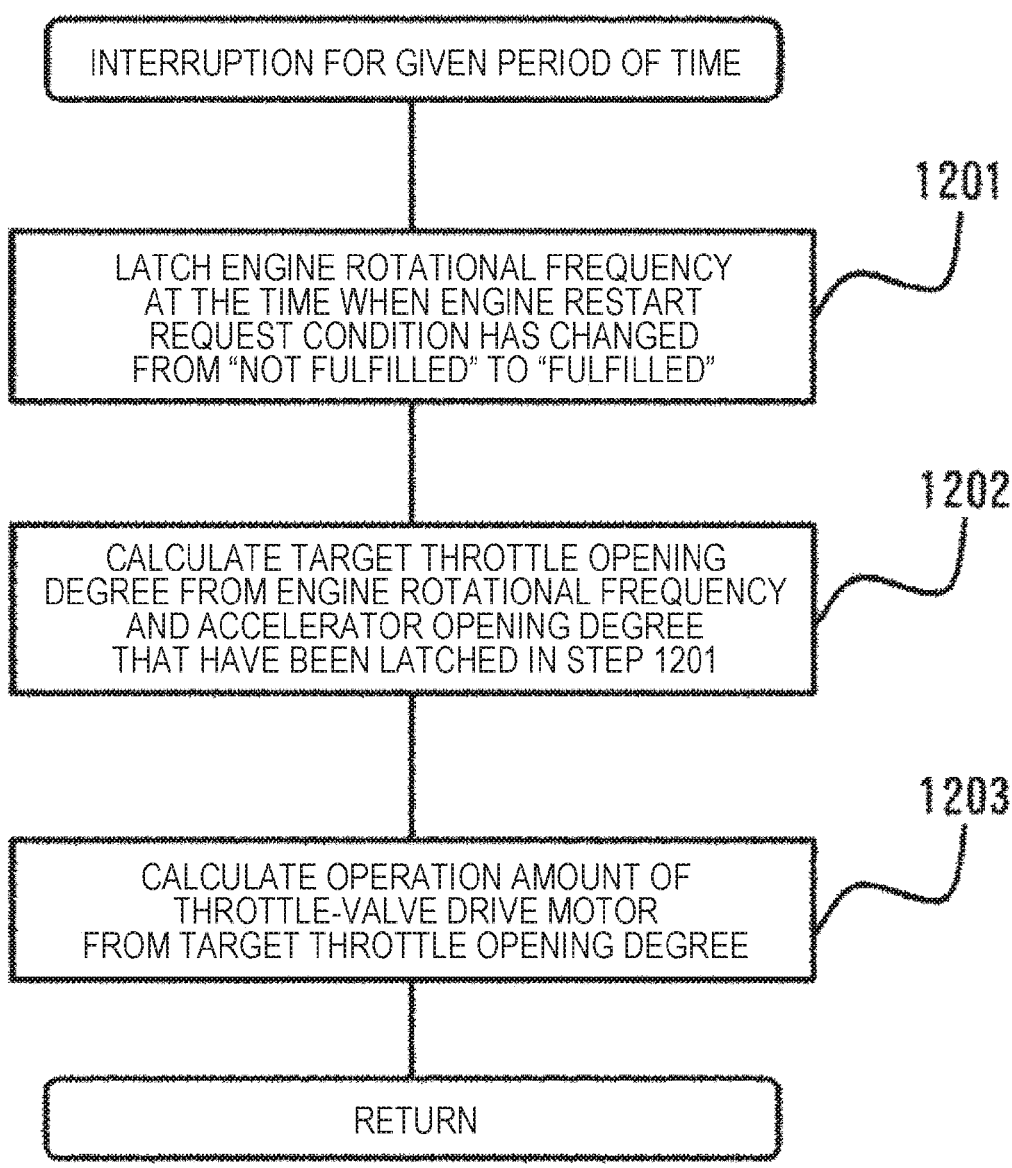
FIG. 12 shows, as an example, a flowchart of step 808 of the vehicle-mounted control device according to the present invention.

FIG. 12 shows, as an example, a flowchart of step 808 in the flowchart shown in FIG. 8 related to the vehicle-mounted control device targeted by the present invention. In step 1201, an engine rotational frequency at the time when the engine restart request condition has changed from "not fulfilled" to "fulfilled" is latched. In step 1202, a target throttle opening degree is calculated from the engine rotational frequency and the accelerator opening degree that have been latched in step 1201. A map, the axes of which are the engine rotational frequency and the accelerator opening degree, is set beforehand, and a value obtained by searching the map may be used as the target throttle opening degree.

In addition, with respect to this setting, for example, an increment in throttle opening degree based on the accelerator opening degree may be limited to a predetermined ratio or less or a predetermined amount or less, or may be limited within a range from a throttle opening degree limit value to a value less than an accelerator operation amount equivalent value so as to be limited to an idling-rotation maintaining equivalent value or less. In step 1203, the operation amount of the throttle-valve drive motor is calculated from a target throttle opening degree, and the charging efficiency of the engine is controlled on the basis of the operation amount.

Figure 13:
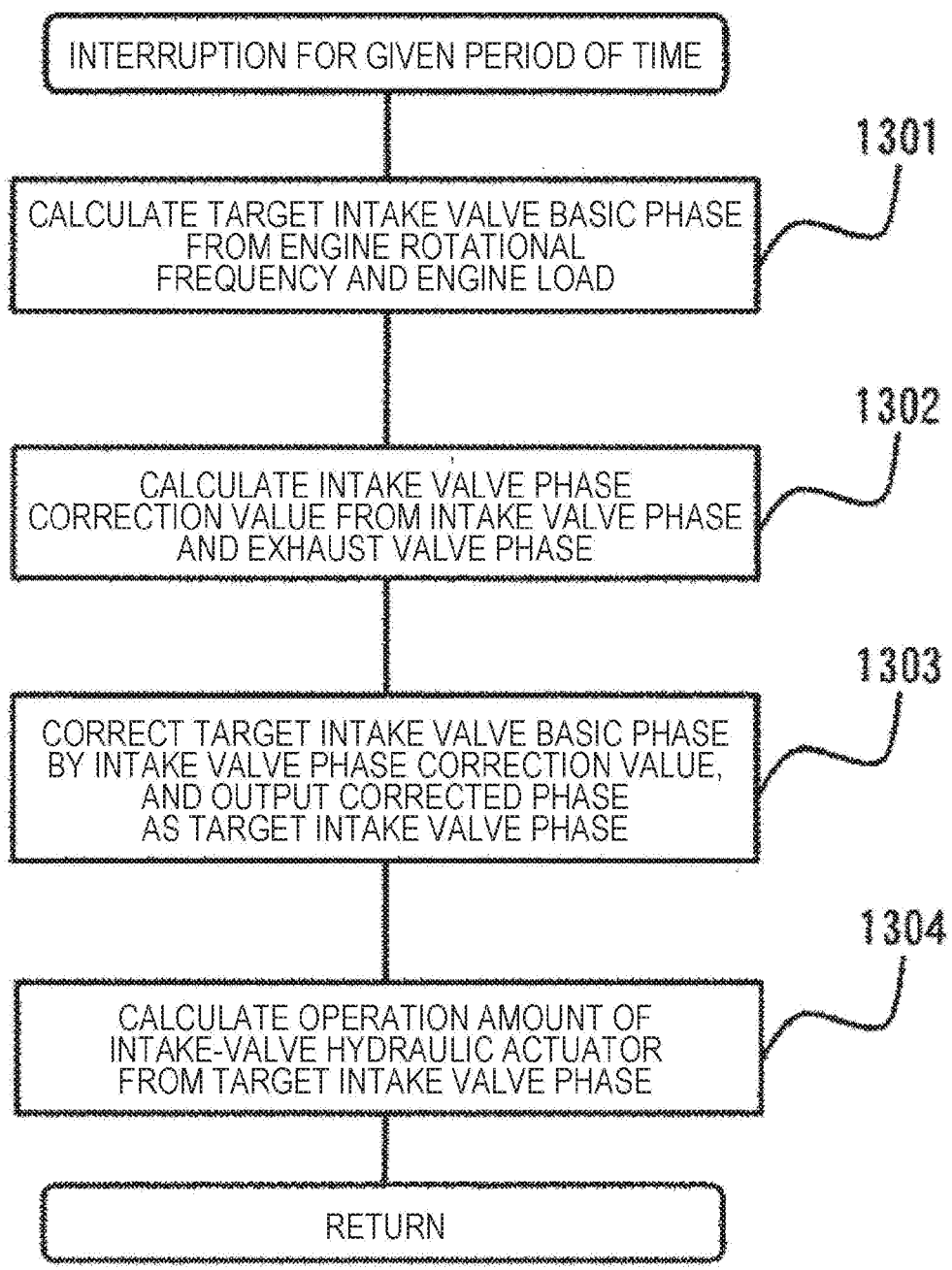
FIG. 13 shows, as an example, a flowchart of step 808 of the vehicle-mounted control device according to the present invention.

FIG. 13 shows, as an example, a flowchart of step 808 in the flowchart shown in FIG. 8 related to the vehicle-mounted control device targeted by the present invention.

In step 1301, a target intake valve basic phase is calculated from an engine rotational frequency and an engine load. A map, the axes of which are the engine rotational frequency and the engine load, is set beforehand, and a value obtained by searching the map may be used as the target intake valve basic phase. In addition, this setting may be made on the basis of, for example, an intake valve phase corresponding to an idling maintaining equivalent value.

Incidentally, the engine load is typified by a value obtained by converting the output of the intake-pipe pressure sensor provided in the intake pipe into an intake pipe pressure by predetermined processing, or the intake air amount measured by an intake-air amount sensor such as a thermal air meter. In step 1302, an intake valve phase correction value is calculated from an intake valve phase and an exhaust valve phase. A map, the axes of which are the intake valve phase and the exhaust valve phase, is set beforehand, and a value obtained by searching the map may be used as the intake valve phase correction value.

In addition, this setting may be made on the basis of, for example, the amount of overlap between the intake valve and the exhaust valve. In step 1303, the target intake valve basic phase is corrected by the intake valve phase correction value, and is output as a target intake valve phase. In step 1304, the operation amount of the intake-valve hydraulic actuator is calculated from the target intake valve phase, and the charging efficiency of the engine is controlled on the basis of the operation amount.

Lastly, preferred modes of the present invention will be summarized.

As a vehicle-mounted control device in one mode of the present invention, there is provided a vehicle-mounted control device that controls a charging efficiency of an engine on the basis of a requested engine output amount, wherein: the engine is automatically stopped when a predetermined automatic stop condition is fulfilled; and a charging efficiency at the time when an engine restart condition has been fulfilled on the basis of an engine output request during a time interval between the fulfillment of the automatic stop condition and complete stop of the engine is lower than a charging efficiency for the requested engine output amount.

The charging efficiency of the engine at the time when the engine restart condition has been fulfilled is made lower than the charging efficiency for the requested engine output amount, thereby suppressing an increase in the engine reverse rotational frequency before the engine completely stops, and suppressing a change in the rotation behavior of the engine. This enables to improve the engagement performance between the starter and the engine, and to ensure the durability.

Preferably, when the automatic stop condition has been fulfilled, the engine is automatically stopped with the power transmission path between the engine and the wheels disconnected.

The engine is automatically stopped while the vehicle is traveling, and the vehicle is inertially traveling with the power transmission path between the engine and the wheels disconnected, which enables to lengthen a travel distance. Therefore, the number of times acceleration requests are made by a driver can be reduced, and a reduction in fuel consumption can be achieved.

More preferably, the charging efficiency of the engine at the time when a starting condition has been fulfilled is controlled by at least one of an opening degree of the throttle valve, the opening and closing timing of the throttle valve, an opening degree of the intake valve, and the opening and closing timing of a suction valve.

Controlling the charging efficiency of the engine by at least one of the throttle valve and the intake valve enables to obtain a wide control range, and enables the control with quick responsiveness.

More preferably, during a time period until the connection between the engine starting device and the engine is completed, the charging efficiency of the engine at the time when the restart condition has been fulfilled is made lower than the charging efficiency for the requested accelerator amount requested by the driver.

When a restart request based on the accelerator operation of the driver has been generated, the time period during which the charging efficiency of the engine at the time when the restart condition has been fulfilled is made lower than the charging efficiency for the requested accelerator amount requested by the driver is set to a time period until the completion of the connection between the engine starting device and the engine. Consequently, an accelerator response after the completion of the connection can be enhanced.

In addition, preferably, during a time period until the complete explosion of the engine, the charging efficiency of the engine at the time when the restart condition has been fulfilled is made lower than the charging efficiency for the requested accelerator amount requested by the driver.

When a restart request based on the accelerator operation of the driver has been generated, the time period during which the charging efficiency of the engine at the time when the restart condition has been fulfilled is made lower than the charging efficiency for the requested accelerator amount requested by the driver is set to a time period until the complete explosion of the engine. Consequently, even when the reverse rotation of the engine occurs at the time of the connection between the engine starting device and the engine or after the completion of the connection, the restart performance can be ensured by preventing the reverse rotational frequency from increasing, and by avoiding incapability of cranking. The complete explosion described here is a state in which the spontaneous operation (combustion state) can be maintained without stopping even in a case where the engine has no starting device.

Moreover, preferably, when the engine is restarted by using the starter motor, the charging efficiency of the engine at the time when the restart condition has been fulfilled is limited to a value lower than the charging efficiency for the requested accelerator amount requested by the driver; and when the engine is restarted without using the starter motor, the charging efficiency of the engine at the time when the restart condition has been fulfilled is not limited.

When the engine is restarted without using the starter, the charging efficiency of the engine is limited only in a mode in which not limiting the charging efficiency of the engine at the time when the restart condition has been fulfilled requires starting by the starter, and deterioration in engagement due to the reverse rotation of the engine occurs. This enables to prevent a response of the accelerator from deteriorating in a starting mode that does not use the starter.

Further, preferably, the charging efficiency of the engine at the time when the restart condition has been fulfilled is controlled according to the engine rotational frequency at the time when the restart condition has been fulfilled.

When the engine rotational frequency at the time of the fulfillment of the restart condition is higher than the engine rotational frequency that enables the starter to engage with the engine, the charging efficiency of the engine can be controlled, on the basis of these relative values, during a time period during which the engine rotational frequency that enables the engagement is reached. Therefore, it is possible to prevent an increase in the reverse rotational frequency of the engine, and it is also possible to prevent an accelerator response from deteriorating.

Furthermore, preferably, the control device is mounted to a vehicle provided with a starter motor that is connected to an engine when the engine is started, and that drives the engine.

When a restart request is generated during a time interval between the fulfillment of the engine automatic stop condition and complete stop, even when restarting only by combustion recovery is not possible, cranking that uses the starter enables the engine to restart.

In addition, there is provided a vehicle-mounted control device that controls a charging efficiency of an engine on the basis of a requested engine output amount, wherein the engine is automatically stopped when a predetermined automatic stop condition is fulfilled, and at least one of the following controls is executed: a throttle valve opening degree at the time when the engine restart condition has been fulfilled on the basis of an engine output request during a time interval between the fulfillment of the automatic stop condition and complete stop of the engine is made lower than a throttle valve opening degree for the requested engine output amount; a throttle valve valve-opening start timing at the time when the engine restart condition has been fulfilled on the basis of an engine output request during a time interval between the fulfillment of the automatic stop condition and complete stop of the engine is made slower than a throttle valve valve-opening start timing for an engine output request timing; a suction valve opening degree at the time when the engine restart condition has been fulfilled on the basis of an engine output request during a time interval between the fulfillment of the automatic stop condition and complete stop of the engine is made lower than a suction valve opening degree at the time when the restart condition is not fulfilled; and a suction valve valve-opening start timing at the time when the engine restart condition has been fulfilled on the basis of an engine output request during a time interval between the fulfillment of the automatic stop condition and complete stop of the engine is made slower than a suction valve valve-opening start timing at the time when the restart condition is not fulfilled. In addition, when the charging efficiency of the engine is limited, it is preferable to keep the charging efficiency at the intake air amount/ the throttle valve opening degree corresponding to only an idling-rotational-frequency maintaining equivalent value, and after the completion of engine starting, to operate up to an opening degree equivalent to the accelerator operation amount at a predetermined speed. As the result, the amount of intake air does not increase in a compression stroke immediately before the engine rotational frequency becomes 0, and a reverse rotation phenomenon does not increase.

Moreover, with respect to a method for operating a charging efficiency by using a throttle valve opening degree, it can be considered that, for example, a throttle increment by an accelerator opening degree is limited to a predetermined ratio or a predetermined amount. After an engine stop is determined, when a throttle valve opening degree is limited to an idling rotational frequency maintaining value or less until a fuel cut and an engine rotation stop, a wider range of limitation can be considered, from fixing the throttle valve opening degree to an opening degree limit value, to controlling the throttle valve opening degree to be less than a value equivalent to the accelerator operation amount.

In the operation in a closing direction, the throttle opening degree exhibits an effect of decreasing a reverse rotation phenomenon, and in the operation in an opening direction, the throttle opening degree exhibits an effect of increasing the explosive force of engine combustion. Accordingly, it is preferable to make a selection as appropriate according to the balance between the responsiveness of required accelerator operation and a degree of combustion explosive force.

Furthermore, with respect to a time period during which the charging efficiency of the engine is limited, when the starter is started, first of all, a pinion is pushed out in a ring gear direction by the magnetic force, and when the pinion reaches a stroke at a level that enables the pinion to engage with the ring gear, a magnet switch that causes a motor to be rotationally driven is energized, and consequently the rotation of the motor is started. Therefore, the response time is required from the time at which a starter starting signal is generated before the pinion engages with the ring gear. Accordingly, when the starter is started, it is preferable to estimate an engine rotational frequency after the time equivalent to the response time, and then to determine, from the estimated rotational frequency, whether or not the starter engagement is possible.

It should be noted that although the above description has been made with an example in which the engine is started by using the starter motor, the present invention can also be similarly applied to starting that uses a high-power starting motor used for a hybrid car or the like. This is because it is necessary to avoid the occurrence of a malfunction such as a burnout of a current circuit. Even in the case of a starting motor, the malfunction may occur when the engine is driven in a forward rotation direction during a reverse rotation phenomenon. In addition, the present example shows an example in which the charging efficiency of the engine is directly controlled by the engine control unit that directly controls the engine as shown in FIG. 2. However, the present invention not limited to this example. The control may be performed in such a manner that from, for example, a transmission control unit that controls the transmission 112, an automatic traveling control unit that controls automatic traveling of the vehicle, or a starter control unit that independently controls only the starter main body 108, an instruction related to the limitation of the charging efficiency of the engine is transmitted to the engine control unit through a communication network that connects among the control units. In this case, it is preferable that the fulfillment of the engine automatic stop condition, the fulfillment of the restart request, sensor information related to the above, and the like, be shared among the control units through the communication network.

Although the embodiment of the present invention has been explained in detail as above, the present invention is not limited to the above-described embodiment. In addition, the components are not each limited to the above-described configurations unless the characteristic functions of the present invention are impaired.

REFERENCE SIGNS LIST

103 ECU (engine Control Unit)
108 starter
113 ring gear
114 crank angle sensor
115 starter solenoid
117 pinion gear
119 starter motor
121 battery
122 accelerator pedal
123 accelerator opening degree sensor
124 brake pedal
125 brake switch
128 vehicle speed sensor
203 crank angle sensor
204 intake-air amount sensor
205 intake-pipe pressure sensor
206 vehicle speed sensor
207 accelerator opening degree sensor
208 ignition switch
209 brake switch
211 intake-valve phase sensor
212 exhaust-valve phase sensor

The invention claimed is:

1. A vehicle-mounted control device that controls a charging efficiency of an engine that automatically stops when a predetermined automatic stop condition is fulfilled, wherein
   the vehicle-mounted control device is configured to decrease a charging efficiency for a requested engine output amount at the time of restarting the engine on the basis of an engine output request generated during a predetermined time period from fulfillment of the automatic stop condition until complete stop of the engine,
   the vehicle-mounted control device is mounted to a vehicle provided with a starter motor that cranks the engine to start the engine,
   the vehicle-mounted control device is configured to control the charging efficiency of the engine for the requested engine output amount at the time of restarting the engine to be lower than the charging efficiency for the requested engine output amount,
   wherein when the automatic stop condition has been fulfilled, the engine is automatically stopped with a power transmission path between the engine and wheels disconnected, and
   wherein a charging efficiency of the engine at the time when the restart condition has been fulfilled is controlled by at least one of an opening degree of a throttle valve, an opening and closing timing of the throttle valve, an opening degree of an intake valve, and an opening and closing timing of the suction valve, and
   wherein a charging efficiency of the engine at the time when the restart condition has been fulfilled is controlled according to an engine rotational frequency at the time when the restart condition has been fulfilled.

2. The vehicle-mounted control device according to claim 1, wherein during a time period until a connection between an engine starting device and the engine is completed, the charging efficiency of the engine at the time when the restart condition has been fulfilled is made lower than a charging efficiency for the requested engine output amount.

3. The vehicle-mounted control device according to claim 1, wherein during a time period until complete explosion of the engine, the charging efficiency of the engine at the time when the restart condition has been fulfilled is made lower than a charging efficiency for the requested engine output amount.

4. A vehicle-mounted control device that controls a charging efficiency of an engine that automatically stops when a predetermined automatic stop condition is fulfilled, wherein
   the vehicle-mounted control device is configured to decrease a charging efficiency for a requested engine output amount at the time of restarting the engine on the basis of an engine output request generated during a predetermined time period from fulfillment of the automatic stop condition until complete stop of the engine,
   the vehicle-mounted control device is mounted to a vehicle provided with a starter motor that is capable of cranking the engine to start the engine,
   the vehicle-mounted control device is configured to control the charging efficiency of the engine for the requested engine output amount at the time of restarting the engine to be lower than the charging efficiency for the requested engine output amount, and
   when a restart request of the engine has been generated during the predetermined time period from the fulfillment of the automatic stop condition until complete stop of the engine, at least one of a first restart mode in which fuel injection is restarted to achieve combustion recovery of the engine without using the starter motor, and a second restart mode in which the engine is cranked to restart the engine by using the starter motor, is executed, and a charging efficiency for an engine output request at the time of executing the second restart mode is lower than a charging efficiency for an engine output request at the time of executing the first restart mode.

5. The vehicle-mounted control device according to claim 4, wherein
   when the engine is restarted by using the starter motor, a charging efficiency of the engine at the time when the restart condition has been fulfilled is limited to a value lower than a charging efficiency for the requested engine output amount, and
   when the engine is restarted without using the starter motor, the charging efficiency of the engine at the time when the restart condition has been fulfilled is not limited.

6. A vehicle-mounted control device that controls a charging efficiency of an engine on the basis of a requested engine output amount, wherein
   the engine is automatically stopped when a predetermined automatic stop condition is fulfilled, and the vehicle-mounted control device executes at least one of controls:
   a throttle valve opening degree at the time when the engine restart condition has been fulfilled on the basis of an engine output request during a time interval between the fulfillment of the automatic stop condition and complete stop of the engine is made lower than a throttle valve opening degree for the requested engine output amount;
   a throttle valve valve-opening start timing at the time when the engine restart condition has been fulfilled on the basis of an engine output request during a time interval between the fulfillment of the automatic stop condition and complete stop of the engine is made slower than a throttle valve valve-opening start timing for an engine output request timing;
   a suction valve opening degree at the time when the engine restart condition has been fulfilled on the basis of an engine output request during a time interval between the fulfillment of the automatic stop condition and complete stop of the engine is made lower than a suction valve opening degree at the time when the restart condition is not fulfilled; and
   a suction valve valve-opening start timing at the time when the engine restart condition has been fulfilled on the basis of an engine output request during a time interval between the fulfillment of the automatic stop condition and complete stop of the engine is made slower than a suction valve valve-opening start timing at the time when the restart condition is not fulfilled.

* * * * *